US008515014B2

(12) United States Patent
Blackburn et al.

(10) Patent No.: US 8,515,014 B2
(45) Date of Patent: Aug. 20, 2013

(54) METHODS, APPARATUS AND ARTICLES OF MANUFACTURE TO CHARACTERIZE CUSTOMER-PREMISES NETWORKS (75) Inventors: Stuart Lynch Blackburn, San Ramon, CA (US); Baofeng Jiang, Pleasanton, CA (US); Raghvendra Savoor, Walnut Creek, CA (US); Jin Wang, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 856 days.

(21) Appl. No.: 12/627,600

(22) Filed: Nov. 30, 2009

(65) Prior Publication Data
US 2011/0129071 A1    Jun. 2, 2011

(51) Int. Cl.
H04M 3/30    (2006.01)

(52) U.S. Cl.
USPC .................................. 379/1.04; 379/9.03

(58) Field of Classification Search
USPC .......... 379/1.03, 1.04, 15.03, 90.01, 93.05, 379/201.12, 2, 9, 9.03, 9.04, 10.01, 12, 14, 379/14.01, 26.01–32.02; 375/222, 213, 224; 714/758, 25, 46, 712, 715, 742; 370/241–253
See application file for complete search history.

(56) References Cited

U.S. PATENT DOCUMENTS

| | | | |
|---|---|---|---|
| 6,002,671 A | 12/1999 | Kahkoska et al. | |
| 6,014,425 A | 1/2000 | Bingel et al. | |
| 6,091,713 A | 7/2000 | Lechleider et al. | |
| 6,192,109 B1 | 2/2001 | Amrany et al. | |
| 6,292,468 B1 | 9/2001 | Sanderson | |
| 6,366,644 B1 | 4/2002 | Sisk et al. | |
| 6,477,238 B1 | 11/2002 | Schneider et al. | |
| 6,507,870 B1 | 1/2003 | Yokell et al. | |
| 6,574,308 B1 | 6/2003 | Macdonald et al. | |
| 6,633,545 B1 | 10/2003 | Milbrandt | |
| 6,643,266 B1 | 11/2003 | Pugaczewski | |
| 6,819,746 B1 | 11/2004 | Schneider et al. | |
| 6,820,038 B1 | 11/2004 | Wetzer et al. | |
| 6,826,258 B2 | 11/2004 | Afzal | |

(Continued)

OTHER PUBLICATIONS

U.S. Appl. No. 12/334,169 entitled "Methods and Apparatus to Pre-Qualify User Communities for Communication Services," filed Dec. 12, 2008, 50 pages.

(Continued)

*Primary Examiner* — Md S Elahee
*Assistant Examiner* — Akelaw Teshale
(74) *Attorney, Agent, or Firm* — Hanley, Flight & Zimmerman, LLC (57) ABSTRACT Methods, apparatus and articles of manufacture to characterize customer-premises networks are disclosed. A disclosed example method comprises retrieving a first plurality of performance parameters for a first time interval for respective ones of a plurality of customer-premises devices, the first plurality of customer-premises devices forming a first customer-premises communication network and each communicatively coupled to a first residential gateway, retrieving a second plurality of performance parameters for a second time interval for the respective ones of the first plurality of devices, computing a first metric representative of a performance variability of the first customer-premises communication network from the first and second plurality of performance parameters, and comparing the first metric to a second metric representative of a second performance variability of a second customer-premises communication network communicatively coupled to a second residential gateway to determine whether the first customer-premises communication network is operating in accordance with a normal operating condition.

14 Claims, 5 Drawing Sheets (56) References Cited

U.S. PATENT DOCUMENTS

| | | |
|---|---|---|
| 6,831,945 B1 | 12/2004 | Lovell et al. |
| 6,870,899 B2 | 3/2005 | Lu et al. |
| 6,870,901 B1 | 3/2005 | Gudmundsson et al. |
| 6,873,653 B1 | 3/2005 | Rezvani et al. |
| 6,889,339 B1 | 5/2005 | D'Amico et al. |
| 6,909,781 B1 | 6/2005 | Itri |
| 6,947,441 B1 | 9/2005 | Milbrandt |
| 6,970,560 B1 | 11/2005 | Hench et al. |
| 6,978,015 B1 | 12/2005 | Erickson et al. |
| 7,003,078 B2 | 2/2006 | Starr et al. |
| 7,027,405 B1 | 4/2006 | Khadavi |
| 7,042,983 B2 | 5/2006 | Bauer et al. |
| 7,092,364 B1 | 8/2006 | Franklin et al. |
| 7,099,439 B2 | 8/2006 | Luneau |
| 7,116,760 B2 | 10/2006 | Smith et al. |
| 7,123,584 B2 | 10/2006 | Blackburn |
| 7,126,914 B2 | 10/2006 | Blackburn |
| 7,149,285 B2 | 12/2006 | Kennedy et al. |
| 7,212,496 B1 | 5/2007 | Chong |
| 7,272,209 B2 | 9/2007 | Jiang et al. |
| 7,336,770 B2 | 2/2008 | Starr et al. |
| 7,349,526 B2 | 3/2008 | Urban |
| 7,362,713 B2 | 4/2008 | Jiang et al. |
| 7,388,906 B2 | 6/2008 | Hart et al. |
| 7,400,720 B2 | 7/2008 | Savoor et al. |
| 7,453,822 B2 | 11/2008 | Slyke et al. |
| 7,515,692 B2 | 4/2009 | Wang et al. |
| 7,529,347 B2 | 5/2009 | Warner et al. |
| 7,593,833 B2 | 9/2009 | Savoor et al. |
| 7,746,774 B2 * | 6/2010 | Xue et al. ............... 370/230 |
| 2001/0043675 A1 | 11/2001 | Starr |
| 2005/0002383 A1 | 1/2005 | Lu et al. |
| 2005/0122916 A1 | 6/2005 | Rubin et al. |
| 2005/0141492 A1 | 6/2005 | Chan |
| 2006/0072722 A1 * | 4/2006 | Savoor et al. ............... 379/93.05 |
| 2006/0109979 A1 | 5/2006 | Afzal et al. |
| 2006/0159026 A1 | 7/2006 | Wu et al. |
| 2006/0159232 A1 | 7/2006 | Jiang et al. |
| 2006/0228113 A1 | 10/2006 | Cutillo et al. |
| 2007/0036339 A1 | 2/2007 | Cioffi et al. |
| 2007/0109974 A1 | 5/2007 | Cutillo et al. |
| 2007/0208537 A1 * | 9/2007 | Savoor et al. ............... 702/182 |
| 2007/0263774 A1 | 11/2007 | Wollmershauser et al. |
| 2008/0043948 A1 * | 2/2008 | Schultz ............... 379/112.05 |
| 2008/0080389 A1 | 4/2008 | Hart et al. |
| 2008/0198754 A1 | 8/2008 | Savoor et al. |
| 2008/0267215 A1 | 10/2008 | Blackburn et al. |
| 2008/0285635 A1 | 11/2008 | Wang et al. |
| 2008/0292064 A1 | 11/2008 | Wu et al. |
| 2009/0074153 A1 | 3/2009 | Wu et al. |
| 2009/0077257 A1 | 3/2009 | Savoor et al. |
| 2009/0168973 A1 | 7/2009 | Wang et al. |
| 2009/0225672 A1 | 9/2009 | Yi et al. |

OTHER PUBLICATIONS

"Sticking Close to Home—Technology Information," Ken Alton, http://findarticles.com/p/articles/mi_m0/TLC/is_8_35/ai_77712360/print?tag=artBody;col1, Aug. 2001, 3 pages.

"Functional Criteria for the DS1 Interface Connector," BellSouth Telecommunications, TR 73569, Issue A, Jun. 1993, 73 pages.

"Network interface unit," Author Unknown, http://www.hill2dot0.com/wiki/index.php?title=Network_interface_unit, Oct. 21, 2008, 2 pages.

* cited by examiner

FIG. 5 ns networks.

METHODS, APPARATUS AND ARTICLES OF MANUFACTURE TO CHARACTERIZE CUSTOMER-PREMISES NETWORKS

FIELD OF THE DISCLOSURE

This disclosure relates generally to customer-premises networks and, more particularly, to methods, apparatus and articles of manufacture to characterize customer-premises networks.

BACKGROUND

Communication systems using twisted-pair copper wire technologies such as digital subscriber line (DSL) technologies, wireless technologies such as those defined by the Institute of Electrical and Electronics Engineers (IEEE) 802.16 standard, satellite technologies and/or coaxial cable technologies are commonly utilized to provide Internet-related services to subscribers such as homes and/or businesses (also referred to herein collectively and/or individually as users, customers and/or customer premises). For example, a communication company and/or service provider may utilize a plurality of modems (e.g., a plurality of DSL, coaxial and/or wireless modems) implemented at a central location (e.g., a central office, a vault, a coaxial cable head-end, a wireless access point, etc.) to provide communication services to a plurality of residential gateways (RGs) located at respective customer premises. In general, a central-site modem receives broadband service content from, for example, a backbone server and forms downstream signals to be transmitted to respective customer-premises RGs. Each RG may subsequently deliver all or any portion(s) of a received downstream signal to respective customer-premises devices associated with the RG. Likewise, the central-site modem receives an upstream signal from each of the RGs and/or customer-premises devices associated with the RGs and provides the data transported in the upstream signal to the backbone server.

DETAILED DESCRIPTION

Methods, apparatus and articles of manufacture to characterize customer-premises networks are disclosed. A disclosed example method includes retrieving a first plurality of performance parameters for a first time interval for respective ones of a first plurality of customer-premises devices, wherein the first plurality of customer-premises devices form a first customer-premises communication network and each of the first plurality of customer-premises devices is communicatively coupled to a first residential gateway, retrieving a second plurality of performance parameters for a second time interval for the respective ones of the first plurality of customer-premises devices, computing a first metric from the first and second plurality of performance parameters, the first metric representative of a performance variability of the first customer-premises communication network, and comparing the first metric to a second metric representative of a second performance variability of a second customer-premises communication network communicatively coupled to a second residential gateway to determine whether the first customer-premises communication network is operating in accordance with a normal operating condition.

A disclosed example article of manufacture store machine readable instructions which, when executed, cause a machine to retrieve a first plurality of performance parameters for a first time interval for respective ones of a first plurality of customer-premises devices, wherein the first plurality of customer-premises devices form a first customer-premises communication network and each of the first plurality of customer-premises devices is communicatively coupled to a first residential gateway; retrieve a second plurality of performance parameters for a second time interval for the respective ones of the first plurality of customer-premises devices; retrieve a third plurality of performance parameters for the first time interval for respective ones of a second plurality of customer-premises devices, wherein the second plurality of customer-premises devices form a second customer-premises communication network and each of the second plurality of customer-premises devices are communicatively coupled to a second residential gateway; retrieve a fourth plurality of performance parameters for the second time interval for respective ones of the second plurality of customer-premises devices; compute a first metric from the first and third plurality of performance parameters, the first metric representative of a first performance variability of the first and second customer-premises communication networks during the first time interval; compute a second metric from the second and fourth plurality of performance parameters, the second metric representative of a second performance variability of the first and second customer-premises communication networks during the second time interval; and compare the first and second metrics to determine whether the first and second customer-premises communication networks are operating in accordance with a normal operating condition during the second time interval.

A disclosed example apparatus includes a data collector to retrieve a first plurality of performance parameters for a first time interval for respective ones of a first plurality of customer-premises devices, wherein the first plurality of customer-premises devices form a first customer-premises communication network and each of the first plurality of customer-premises devices is communicatively coupled to a first residential gateway, and retrieve a second plurality of performance parameters for a second time interval for the respective ones of the first plurality of customer-premises devices, a variability analyzer to compute a first metric from the first and second plurality of performance parameters, the first metric representative of a performance variability of the first customer-premises communication network, and a network characterizer to compare the first metric to a second metric representative of a second performance variability of a second customer-premises communication network communicatively coupled to a second residential gateway to determine whether the first customer-premises communication network is operating in accordance with a normal operating condition.

For clarity of illustration and explanation, example methods, apparatus and articles of manufacture are described herein with reference to communication systems implemented using digital subscriber line (DSL) technologies to transport data to and/or from customer premises. However, the examples disclosed herein may, additionally or alternatively, be used to characterize customer-premises networks for any number and/or type(s) of other communication technology(-ies) and/or protocol(s). Other example technologies and/or protocols include, but are not limited to, those associated with public switched telephone network (PSTN) systems, public land mobile network (PLMN) systems (e.g., cellular), wireless distribution systems, Institute of Electrical and Electronics Engineers (IEEE) 802.16 based distribution systems (a.k.a. WiMAX), wired distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, passive optical network (PON) systems, and/or any combination and/or hybrid of these devices, systems and/or networks.

Figure 1:
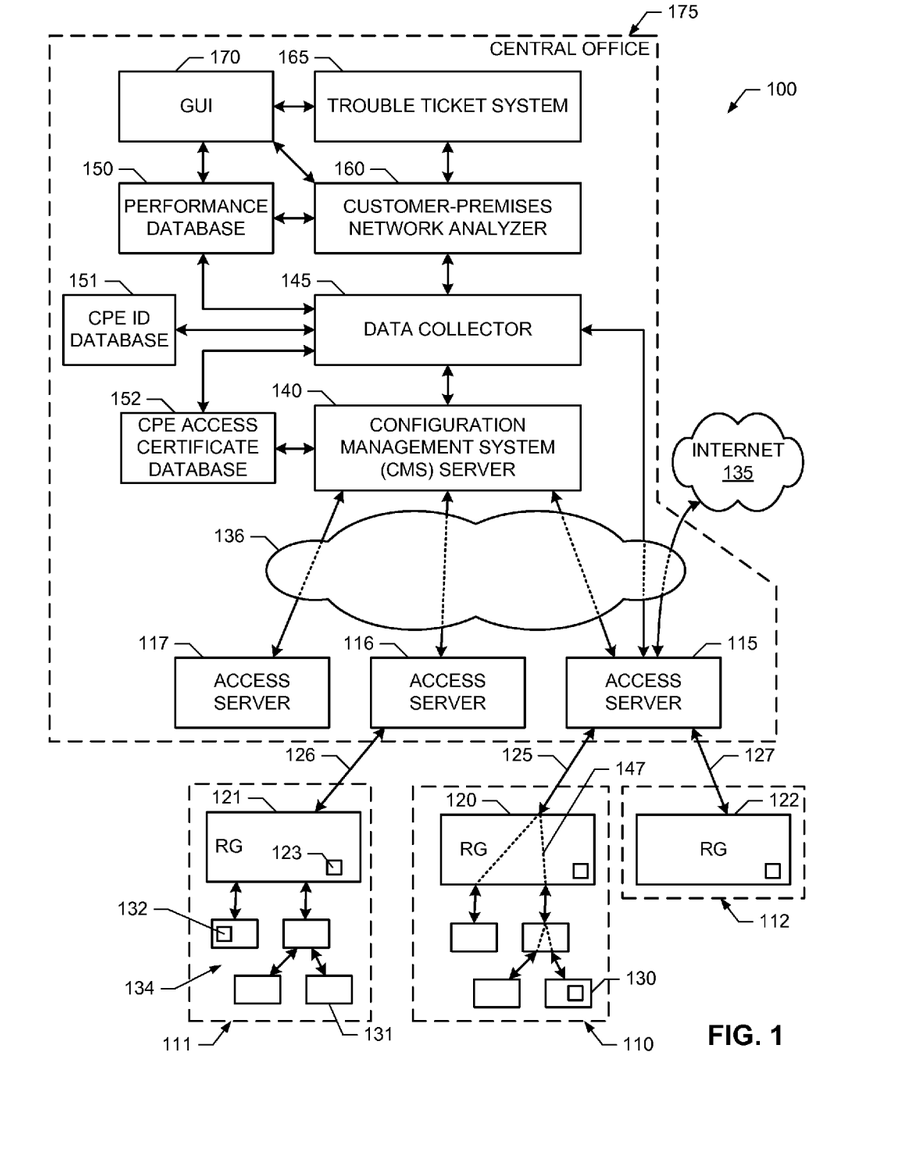
FIG. 1 is a schematic illustration of an example DSL communication system constructed in accordance with the teachings of the invention.

FIG. 1 illustrates an example DSL communication system 100 that provides data and/or communication services (e.g., telephone services, Internet services, data services, messaging services, instant messaging services, electronic mail (email) services, chat services, video services, audio services, gaming services, etc.) to one or more customer premises, three of which are designated at reference numerals 110, 111 and 112. To provide DSL communication services to the example customer premises 110-112, the example communication system 100 of FIG. 1 includes any number and/or type(s) of access servers, three of which are designated at reference numerals 115, 116 and 117, and the example customer premises 110-112 include any type(s) of customer-premises residential gateways (RGs) 120, 121 and 122. Example access servers 115-117 include, but are not limited to, a DSL access multiplexer (DSLAM) and/or a video ready access device (VRAD). The example access servers 115-117 of FIG. 1 include and/or implement one or more central office (CO) DSL modems (not shown) for respective ones of the customer-premises locations 110-112. The example access servers 115-117, the CO DSL modems within the access servers 115-117, and/or the example RGs 120-121 may be implemented, for example, in accordance with the International Telecommunications Union—Telecommunications Sector (ITU-T) G.993.x family of standards for very high-speed DSL (VDSL), and/or the ITU-T G.992.x family of standards for asymmetric DSL (ADSL).

In the illustrated example of FIG. 1, the access server 115 provides DSL services to the RGs 120 and 122 via respective subscriber lines 125 and 127, and the access server 116 provides DSL services to the RG 121 via a subscriber line 126. Subscriber lines are sometimes also referred to in the industry as "wire-pairs", "subscriber loops" and/or "loops." A subscriber line (e.g., any of the example subscriber lines 125-127) used to provide a DSL service to a customer-premises location (e.g., any of the locations 110-112) may include and/or be constructed from one or more segments of twisted-pair telephone wire, fiber and/or coaxial cable (e.g., a combination of a feeder one (F1) cable, a distribution cable, a drop cable, and/or customer-premises wiring), terminals and/or distributions points (e.g., a serving area interface (SAI), a serving terminal, a vault and/or a pedestal). Such segments of twisted-pair telephone wire may be spliced and/or connected end-to-end, and/or may be connected at only one end, thereby creating one or more bridged-taps. Regardless of the number, type(s), gauge(s) and/or topology of twisted-pair telephone wires used to construct the example subscriber lines 125-127, these lines will be referred to herein in the singular form, but it will be understood that the term "subscriber line" may refer to one or more twisted-pair telephone wire segments and may include one or more bridged taps.

Within each of the example customer premises 110-112 of FIG. 1 one or more additional customer-premises communication devices, two or which are designated at reference numerals 130 and 131, may be communicatively coupled to the RG 120-122 and/or to each other to form a customer-premises communication network, one of which is designated at reference numeral 134. Example customer-premises networks 134 include, but are not limited to, a local area network (LAN), an Ethernet over power line network, an Ethernet over telephone line network, and/or a wireless LAN (WLAN). Example customer-premises devices 130 and 131 include, but are not limited to, a set-top box (STB), a network-interface card (NIC), a wireless adapter, a television, a personal computer (PC), and/or an appliance. As shown in FIG. 1, the customer-premises devices 130 and 131 may be directly and/or indirectly communicatively coupled to their associated RG 120-122 and/or other customer-premises devices 130 and 131.

In the illustrated example of FIG. 1, the customer-premises devices 130 and 131, the RGs 120-122 and/or, more generally, the example customer-premises networks 134 may be communicatively coupled to any number and/or type(s) of private network(s) and/or public network(s) such as the Internet 135 via the example access servers 115-117. In some examples, the access servers 115-117 may be communicatively coupled to the Internet 135 via a service-provider network 136.

The customer-premises devices 130 and 131 and the RGs 120-122 of FIG. 1 may be customer owned, may be leased and/or rented by a customer from a service provider, and/or may be owned by the service provider. Some or all of the example customer-premises devices 130 and 131 and the RGs 120-122 are configured by a configuration management system (CMS) 140 owned, operated and/or implemented by the service provider associated with the example communication system 100. The example CMS 140 of FIG. 1, among other things, configures the customer-premises devices 130 and 131 and/or the RGs 120-122 with one or more parameters and/or settings that enable the customer-premises devices 130 and 131 and/or the RGs 120-122 to access the Internet 135 and/or other communication services offered by the service provider (e.g., telephone services, data services, messaging services, instant messaging services, email services, chat services, video services, television services, audio services, gaming services, etc.).

The example customer-premises networks 134 of FIG. 1 may be implemented using any number and/or type(s) of communication technologies, communication media and/or communication protocols. Some example customer-premises communication networks 134 are heterogeneous and simultaneously implement different wired and/or wireless communication technologies. Additionally or alternatively, some example customer-premises communication networks 134 implement different communication protocols. Within such customer-premises networks 134, communication network performance (e.g., data rate, noise, error rate, etc.) may vary with time in response to any number and/or type(s) of factors and/or events such as radio frequency interference, storms, software updates, installation of new devices 130, 131, temperature changes, replacement of devices 130, 131, technician repairs, cabling changes, etc.

Customer-premises networks 134 are conventionally evaluated using current performance information such as the current communication data rate. However, reliable determination of speed and/or quality-of-service using only current performance information may be difficult. Moreover, communication network troubleshooting is often concerned with detecting, diagnosing and/or resolving intermittent problems, which are generally not accurately reflected and/or captured by current performance information. Further still, such current performance information does not readily enable a determination of whether a customer-premises network 134 is operating and/or performing differently than during a previous time interval, and/or does not enable comparisons between different customer-premises networks 134 to determine whether any particular customer-premises network 134 is operating and/or performing differently than in accordance with a normal operating condition (e.g., differently than intended, differently than normal, differently than expected, differently than predicted) and/or differently from other customer-premises networks 134.

To overcome at least these deficiencies, the example methods, apparatus and articles of manufacture described herein collect performance information from the RGs 120-122 and/or the customer-premises devices 130 and 131, and process the collected performance information to characterize the customer-premises communication networks 134. The collected performance information is used to compute metrics that represent how the performance of the customer-premises networks 134 change over time and/or how the performance of the customer-premises networks 134 differ from other customer-premises networks 134.

To collect performance information, the example communication system 100 of FIG. 1 includes a data collector 145. Periodically and/or aperiodically, the example data collector 145 of FIG. 1 collects performance information, data and/or variables from the RGs 120-122 and/or the example customer-premises devices 130 and 131 and stores the collected performance information in a performance database 150. Example performance information that may be collected and/or retrieved from the RGs 120-122 and/or the example customer-premises devices 130 and 131 includes, but is not limited to, average data rate, current data rate, maximum data rate, minimum data rate, average error rate, current error rate, maximum error rate, minimum error rate, maximum noise, average noise, current noise and/or minimum noise. However, any number and/or type(s) of additional and/or alternative performance information, data and/or variables may be collected.

Performance information may be stored in the example performance database 150 of FIG. 1 using any number and/or type(s) of data structures. The example performance database 150 may be implemented using any number and/or type(s) of tangible memory(-ies), memory device(s), and/or storage device(s).

In some examples, the data collector 145 collects performance data via an application programming interface (API) implemented by the example CMS server 140. The data collector 145 requests performance data for one or more RGs 120-122 and/or customer-premises devices 130 and 131 via the API, and the CMS server 140 collects the requested performance data and returns the retrieved performance data to the data collector 145. Additionally or alternatively, the example data collector 145 may collect and/or retrieve the performance information directly from the RGs 120-122 and/or the customer-premises devices 130 and 131 via the network 136 and the access servers 115-117, thereby bypassing the CMS server 140. By retrieving performance information directly, the example data collector 145 can avoid loading the CMS server 140, which may not have been designed to retrieve performance information from large numbers of RGs 120-122 and/or customer-premises devices 130 and 131. To identify and gain secure access to the RGs 120-122 and the customer-premises devices 130 and 131, the example data collector 145 may utilize information from any number and/or type(s) of databases such as a customer-premises equipment (CPE) identifier (ID) database 151 and/or a CPE access certificate database 152.

The example CMS server 140 and/or the example data collector 145 of FIG. 1 may retrieve data from the RGs 120-122 and/or the customer-premises devices 130 and 131 using any number and/or type(s) of method(s) and/or protocol(s). For example, the CMS server 140 and/or the data collector 145 may configure firewall port forwarding or pinholes (one of which is designated at reference numeral 147) on the RGs 120-122 and/or on the customer-premises devices 130 and 131 to enable retrieval directly from the customer-premises devices 130 and 131. Additionally or alternatively, the CMS server 140 and/or the data collector 145 may interact with an API implemented by the RG 120-122 (one of which is designated at reference numeral 123), which retrieves performance information from its associated customer-premises devices 130 and 131 and provides the collected performance information to the requesting CMS server 140 and/or the data collector 145. The CMS server 140 and/or the data collector 145 can also query the APIs 123 to obtain a list of customer-premises devices 130 and 131 associated with the RG 120-122. Each of the example customer-premises devices 130 and 131 of FIG. 1 implement an API (one of which is designated at reference numeral 132) that enables the CMS server 140, the data collector 145 and/or its associated RG 120-122 to retrieve performance information from the customer-premises device 130, 131.

The example data collector 145 of FIG. 1 may periodically (e.g., every few hours) or aperiodically (e.g., when directed by a technician and/or service personnel) retrieve performance information for all monitored RGs 120-122 and/or customer-premises devices 130 and 131. Additionally or alternatively, the data collector 145 may collect performance information for some of the RGs 120-122 and/or customer-premises devices 130 and 131 on a more frequent basis. For example, as described below, based on previously collected performance information a customer-premises network analyzer 160 may select one or more collection configuration parameter(s) and/or setting(s) to configure the data collector 145 to collect performance information more frequently for some customer-premises networks 134 that may not be operating as intended and/or as well as other customer-premises networks 134.

To analyze and/or characterize customer-premises networks 134, the example communication system 100 of FIG. 1 includes the example customer-premises network analyzer 160. Based on and/or from the performance information collected by the example data collector 145, the example customer-premises network analyzer 160 of FIG. 1 computes one or more performance distributions that represent the statistical and/or probabilistic occurrence of performance variables. An example data rate distribution represents the percentage of time that one or more customer-premises networks 134 were operating at particular data rates. The performance distribution may be quantified using percentiles, where each percentile represents the percentage of time spent at or below a corresponding data rate. An example performance distribution has a $1^{st}$ percentile data rate of 20 million bits per second (Mbps) and a $99^{th}$ percentile data rate of 80 Mbps. The $99^{th}$ of 80 Mbps percentile represents that the customer-premises network(s) 134 operated at a data rate of 80 Mbps or less 99% of the time.

The example customer-premises network analyzer 160 of FIG. 1 may, for example, compute performance distributions across different customer-premises networks 134, across different types of customer-premises devices 130 and 131 and/or RGs 120-122, and/or across different time intervals for particular customer-premises network(s) 134, customer-premises devices 130 and 131 and/or RGs 120-122. For example, by computing a performance distribution across multiple customer-premises networks 134 the example customer-premises network analyzer 160 can compare the variability of a particular customer-premises network(s) 134 to the variability of other customer-premises networks 134. Such performance distributions represent structural variability across customer-premises networks 134. Additionally or alternatively, by computing a performance distribution across time for a particular customer-premises network 134 the customer-premises network analyzer 160 can characterize the over time performance variability of that customer-premises network 134. Such performance distributions represent conditional variability within that customer-premises network 134. The customer-premises network analyzer 160 can compute performance distributions for any number and/or type(s) of performance variables including, but not limited to, data rate, error rate, noise levels, etc.

In some examples, a technician and/or customer-service personnel may be interested in fairly rare events, that is, events that occur only 5% or 1% of the time. However, standard deviations computed based on and/or from collected performance information may not be the best method to represent, detect and/or diagnose such infrequent events and/or conditions. The example customer-premises network analyzer 160 of FIG. 1 characterizes the performance variability of one or more customer-premises networks 134 by computing one or more variability metrics from computed performance distributions. An example variability metric comprises a ratio of the performance value associated with a particular performance distribution percentile to the performance value associated with another performance distribution percentile. Using a data rate distribution, an example variability metric can be computed using the following mathematical expression:

$$V_n = (n^{th} \text{ percentile data rate})/((100-n)^{th} \text{ percentile data rate}) \quad \text{EQN (1)}$$

where $V_n$ is the variability metric for the $n^{th}$ percentile, and $n^{th}$ percentile data rate is the data rate associated with the $n^{th}$ percentile of the data rate distribution. As defined in EQN (1), for non-negative underlying metrics, the values of $V_n$ are between zero and one. For a given percentile n, the smaller the metric $V_n$ the more variable the performance of the customer-premises network(s) 134. If the variability metric $V_n$ for a particular customer-premises network 134 is compared with the variability metric $V_n$ computed for a group of customer-premises networks 134, the customer-premises network analyzer 160 can determine whether that particular customer-premises network 134 performs more variably. Variability metrics $V_n$ can also be compared and/or tracked over time to determine how customer-premises network(s) 134 change over time in response to, for example, storms, software updates, configuration changes, installation of new customer-premises devices 130 and 131, temperature changes, replacement of devices 130, 131, technician repairs, cabling changes, etc.

In some examples, the customer-premises network analyzer 160 of FIG. 1 configures the data collector 145 to periodically collect and/or retrieve performance information for the customer-premises networks 134. As the data is collected, the example customer-premises network analyzer 160 computes and/or updates one or more performance distributions and/or variability metrics $V_n$. By comparing variability metrics $V_n$ to each other and/or to one or more thresholds, the customer-premises network analyzer 160 can identify customer-premises networks 134 that may warrant additional or more frequent monitoring. As additional performance information is collected and correlated with field troubleshooting information and/or customer reported performance issues, the threshold(s) used to identify customer-premises networks 134 for additional proactive monitor can be adjusted and/or tuned. If a customer-premises network 134 is identified and/or flagged as possibly not operating as intended, the example customer-premises network analyzer 160 of FIG. 1 may submit a trouble ticket to a trouble ticket system 165.

To manage repair and/or maintenance reports, the example CO 105 of FIG. 1 includes the example trouble ticket system 165. The example trouble ticket system 165 of FIG. 1 implements an API via which the example customer-premises network analyzer 160 can submit a trouble ticket. The example trouble ticket system 165 can also route a submitted trouble ticket to a suitable repair, customer support and/or technical support person for resolution, and tracks the resolution of trouble tickets. In some examples, the trouble ticket system 165 can query the customer-premises network analyzer 160 for performance information and/or variability metrics $V_n$ for identified customer-premises networks 134. For example, when a trouble ticket is submitted by a customer, the trouble ticket system 165 may automatically query the customer-premises network analyzer 160 for performance information and/or variability metrics $V_n$ and add such information to the submitted trouble ticket. Performance distributions and/or variability metrics $V_n$ computed by the example customer-premises network analyzer 160 may be stored in the example performance database 150 for subsequent retrieval by the customer-premises network analyzer 160 and/or via a graphical user interface (GUI) 170.

To allow technicians and/or service personnel to interact with the example trouble ticket system 165, the example data collector 145 and/or the example customer-premises network analyzer 160, the example communication system 100 of FIG. 1 includes any number and/or type(s) of GUIs, one of which is designated at reference numeral 170. The example GUI 170 of FIG. 1 enables a person (e.g., a technician, customer service representative, etc.) to interact with the trouble ticket system 165 to view and/or update trouble tickets, to query the customer-premises network analyzer 160 for variability metrics $V_n$, to locate and/or view performance information, performance distributions and/or variability metrics $V_n$ stored in the performance database 150, and/or to schedule the collection of performance information for one or more customer-premises networks 134.

While in the illustrated example of FIG. 1, the example access servers 115-117, the example CMS server 140, the example data collector 145, the example databases 150-152, the example customer-premises network analyzer 160, the example trouble ticket system 165 and the example GUI 170 are illustrated in connection with an example central office (CO) 175, one or more of the example access servers 115-117, the example CMS server 140, the example data collector 145, the example databases 150-152, the example customer-premises network analyzer 160, the example trouble ticket system 165 and the example GUI 170 may be located and/or implemented separately from the CO 175. For example, the example data collector 145, the example databases 150-152, the example customer-premises network analyzer 160, the example trouble ticket system 165 and the example GUI 170 may be located and/or implemented at a customer service location (not shown), which is communicatively coupled to the service-provider network 136, the CMS server 140 and/or the access servers 115-117 at the CO 175. Further any number of access servers 115-117 may be implemented and/or located at a CO. Moreover, an access server 115-117 may be implemented and/or located at a remote terminal (not shown), which is communicatively coupled to the example data collector 145 via the service-provider network 136 and/or the CMS server 140.

While an example communication system 100 has been illustrated in FIG. 1, the elements illustrated in FIG. 1 may be combined, divided, re-arranged, eliminated and/or implemented in any way. Further, the example access servers 115-117, the example CMS server 140, the example data collector 145, the example databases 150-152, the example customer-premises network analyzer 160, and the example trouble ticket system 165 and/or, more generally, the example communication system 100 of FIG. 1 may be implemented by hardware, software, firmware and/or any combination of hardware, software and/or firmware. Thus, for example, any of the example access servers 115-117, the example CMS server 140, the example data collector 145, the example databases 150-152, the example customer-premises network analyzer 160, and the example trouble ticket system 165 and/or, more generally, the example communication system 100 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example access servers 115-117, the example CMS server 140, the example data collector 145, the example databases 150-152, the example customer-premises network analyzer 160, and the example trouble ticket system 165 and/or, more generally, the example communication system 100 are hereby expressly defined to include a tangible medium such as a memory, a digital versatile disc (DVD), a compact disc (CD), etc. storing the software and/or firmware. Further still, the example teleconferencing system 100 may include additional devices, servers, systems, networks and/or processors in addition to, or instead of, those illustrated in FIG. 1, and/or may include more than one of any or all of the illustrated devices, servers, networks, systems and/or processors.

Figure 2:
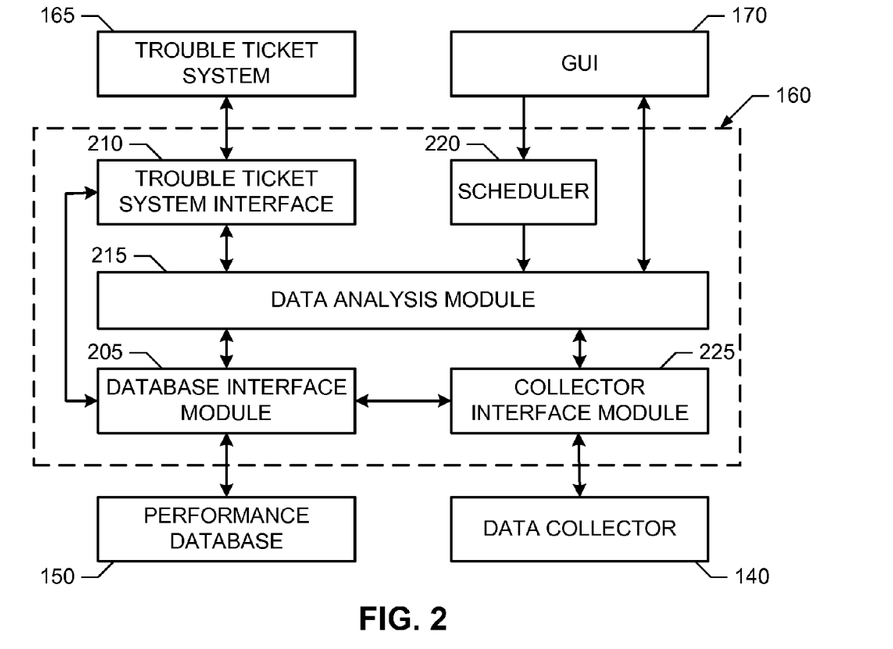
FIG. 2 illustrates an example manner of implementing the example customer-premises network analyzer of FIG. 1.

FIG. 2 illustrates an example manner of implementing the example customer-premises network analyzer 160 of FIG. 1. To interact with the example performance database 150, the example customer-premises network analyzer 160 of FIG. 2 includes a database interface module 205. The example database interface module 205 of FIG. 2 implements one or more APIs to allow other elements of the example customer-premises network analyzer 160 to perform queries of the example performance database 150 to, for example, obtain performance information, performance distributions and/or variability metrics $V_n$. Other elements of the example customer-premises network analyzer 160 can also store performance information, performance distributions and/or variability metrics $V_n$ in the performance database 150 via the database interface module 205.

To interact with the example trouble ticket system 165, the example customer-premises network analyzer 160 of FIG. 2 includes a trouble ticket system interface 210. The example trouble ticket system interface 210 of FIG. 2 submits repair or trouble tickets for customer-premises networks 134 identified by a data analysis module 215. The example trouble ticket system interface 210 submits a trouble ticket by, for example, accessing and/or utilizing an API provided and/or implemented by the example trouble ticket system 165. In some examples, the trouble ticket system interface 210 includes diagnostic data (e.g., collected and/or retrieved performance information, computed performance distributions and/or computed variability metrics $V_n$) as part of a submitted trouble ticket. Such included information may be used by, for example, a repair technician while diagnosing a potential, reported, suspected and/or detected problem. The trouble ticket system 165 may also query the customer-premises network analyzer 160 for performance information, computed performance distributions and/or computed variability metrics $V_n$ via the trouble ticket system interface 210.

To analyze collected and/or retrieved performance information, the example customer-premises network analyzer 160 of FIG. 2 includes the example data analysis module 215 and a scheduler 220. The example scheduler 220 of FIG. 1 directs the example data analysis module 215 to periodically or aperiodically collect performance information via the data collector 140 and/or to compute performance distributions and/or variability metrics $V_n$. The data collected times set by the scheduler 220 may be programmed by a technician via the example GUI 170. An example manner of implementing the example data analysis module 215 is described below in connection with FIG. 3.

To interact with the example data collector 140, the example customer-premises network analyzer 160 of FIG. 2 includes a collector interface module 225. The example collector interface module 225 of FIG. 2 implements one or more APIs to allow the example data analysis module 215 to configure the collection and/or retrieval of performance information by the data collector 140, and/or to receive collected performance information from the data collector 140 and store the collected performance in the performance database 150 via the database interface module 205.

While an example manner of implementing the example customer-premises network analyzer 160 of FIG. 1 has been illustrated in FIG. 2, the interfaces, modules, elements and/or devices illustrated in FIG. 2 may be combined, divided, re-arranged, eliminated and/or implemented in any way. Further, the example interface modules 205, 210 and 225, the example data analysis module 215, the example scheduler 220 and/or, more generally, the example customer-premises network analyzer 160 of FIG. 2 may be implemented by hardware, software, firmware and/or any combination of hardware, software and/or firmware. Thus, for example, any of the example interface modules 205, 210 and 225, the example data analysis module 215, the example scheduler 220 and/or, more generally, the example customer-premises network analyzer 160 may be implemented by one or more circuit(s), programmable processor(s), ASIC(s), PLD(s) and/or FPLD(s), etc. When any of the appended apparatus claims are read to cover a purely software and/or firmware implementation, at least one of the example interface modules 205, 210 and 225, the example data analysis module 215, the example scheduler 220 and/or, more generally, the example customer-premises network analyzer 160 are hereby expressly defined to include a tangible medium such as a memory, a DVD, a CD, etc. storing the software and/or firmware. Further still, the example customer-premises network analyzer 160 may include additional interfaces, modules, elements and/or devices in addition to, or instead of, those illustrated in FIG. 2, and/or may include more than one of any or all of the illustrated interfaces, modules, elements and/or devices.

Figure 3:
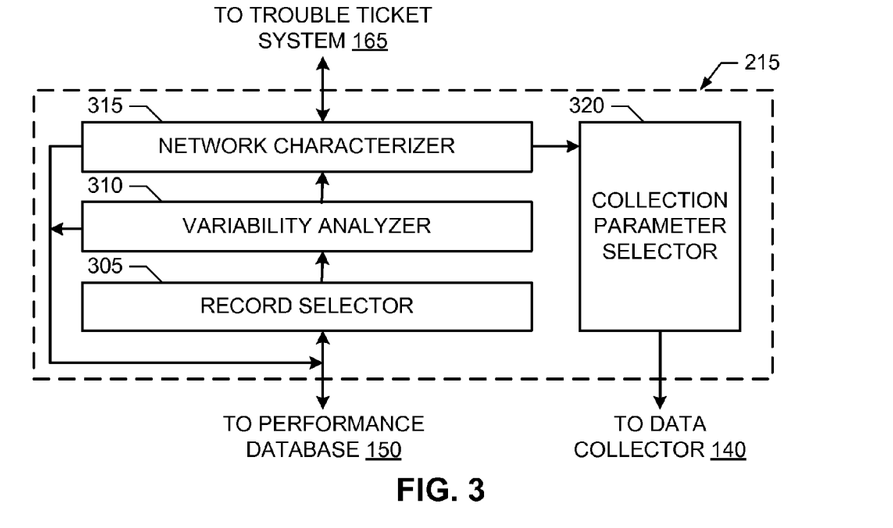
FIG. 3 illustrates an example manner of implementing the example data analysis module of FIG. 2.

FIG. 3 illustrates an example manner of implementing the example data analysis module 215 of FIG. 2. To select performance information records from the example performance database 150, the example data analysis module 215 of FIG. 3 includes a record selector 305. The example record selector 305 of FIG. 3 identifies one or more customer-premises networks 134 and/or performance information collection intervals, and obtains the selected performance information from the example performance database 150 via the example database interface module 205.

To compute variability metrics $V_n$, the example data analysis module 215 of FIG. 3 includes a variability analyzer 310. As described above in connection with FIG. 1, the example variability analyzer 310 of FIG. 3 computes performance distributions from the performance information selected by the example record selector 305. From the computed performance distributions, the example variability analyzer 310 computes one or more variability metrics $V_n$ using, for example, the mathematical expression EQN (1) described above in connection with FIG. 1. The performance distributions and/or variability metrics $V_n$ may be stored in the performance database 150 for subsequent retrieval.

To characterize the customer-premises networks 134, the example data analysis module 215 of FIG. 3 includes a network characterizer 315. The example network characterizer 315 of FIG. 3 compares one or more variability metrics $V_n$ to each other and/or to one or more thresholds to determine whether a particular customer-premises network 134 is operating as intended and/or whether the particular customer-premises network 134 is operating similarly to other customer-premises networks 134. Results of the customer-premises network characterizations may be stored in the example performance database 150 for subsequent retrieval. In some examples, the network characterizer 315 may submit a trouble ticket via the example trouble ticket system interface 210.

To select and/or configure data collection parameters (e.g., which customer-premises networks 134 and/or how often performance information is collected), the example data analysis module 215 of FIG. 3 includes a collection parameter selector 320. For customer-premises networks 134 identified and/or flagged by the example network characterizer 315, the example collection parameter selector 320 of FIG. 3 adjusts, selects and/or increases the rate at which performance information is collected and/or retrieved. When a customer-premises network 134 is no longer flagged, the example collection parameter selector 320 restores its associated collection parameters to their default values.

While an example manner of implementing the example data analysis module 215 of FIG. 2 has been illustrated in FIG. 3, the interfaces, modules, elements and/or devices illustrated in FIG. 3 may be combined, divided, re-arranged, eliminated and/or implemented in any way. Further, the example record selector 305, the example variability analyzer 310, the example network characterizer 315, the example collection parameter selector 320 and/or, more generally, the example data analysis module 215 of FIG. 3 may be implemented by hardware, software, firmware and/or any combination of hardware, software and/or firmware. Thus, for example, any of the example record selector 305, the example variability analyzer 310, the example network characterizer 315, the example collection parameter selector 320 and/or, more generally, the example data analysis module 215 may be implemented by one or more circuit(s), programmable processor(s), ASIC(s), PLD(s) and/or FPLD(s), etc. When any of the appended apparatus claims are read to cover a purely software and/or firmware implementation, at least one of the example record selector 305, the example variability analyzer 310, the example network characterizer 315, the example collection parameter selector 320 and/or, more generally, the example data analysis module 215 are hereby expressly defined to include a tangible medium such as a memory, a DVD, a CD, etc. storing the software and/or firmware. Further still, the example data analysis module 215 may include additional interfaces, modules, elements and/or devices in addition to, or instead of, those illustrated in FIG. 3, and/or may include more than one of any or all of the illustrated interfaces, modules, elements and/or devices.

Figure 4A:
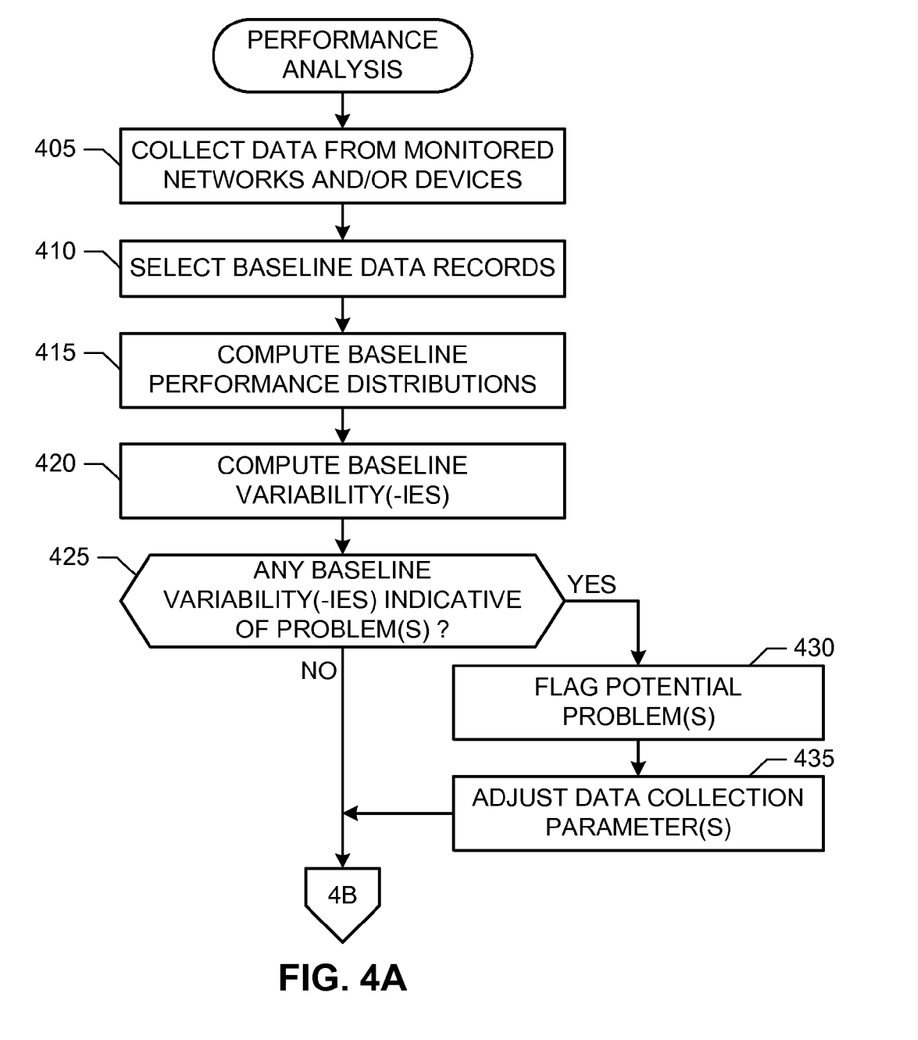
FIGS. 4A and 4B are a flowchart representative of example process that may be carried out by, for example, a processor to implement the example customer-premises network analyzer of FIGS. 1 and 2 and/or the example data analysis module of FIGS. 2 and 3.
Figure 4B:
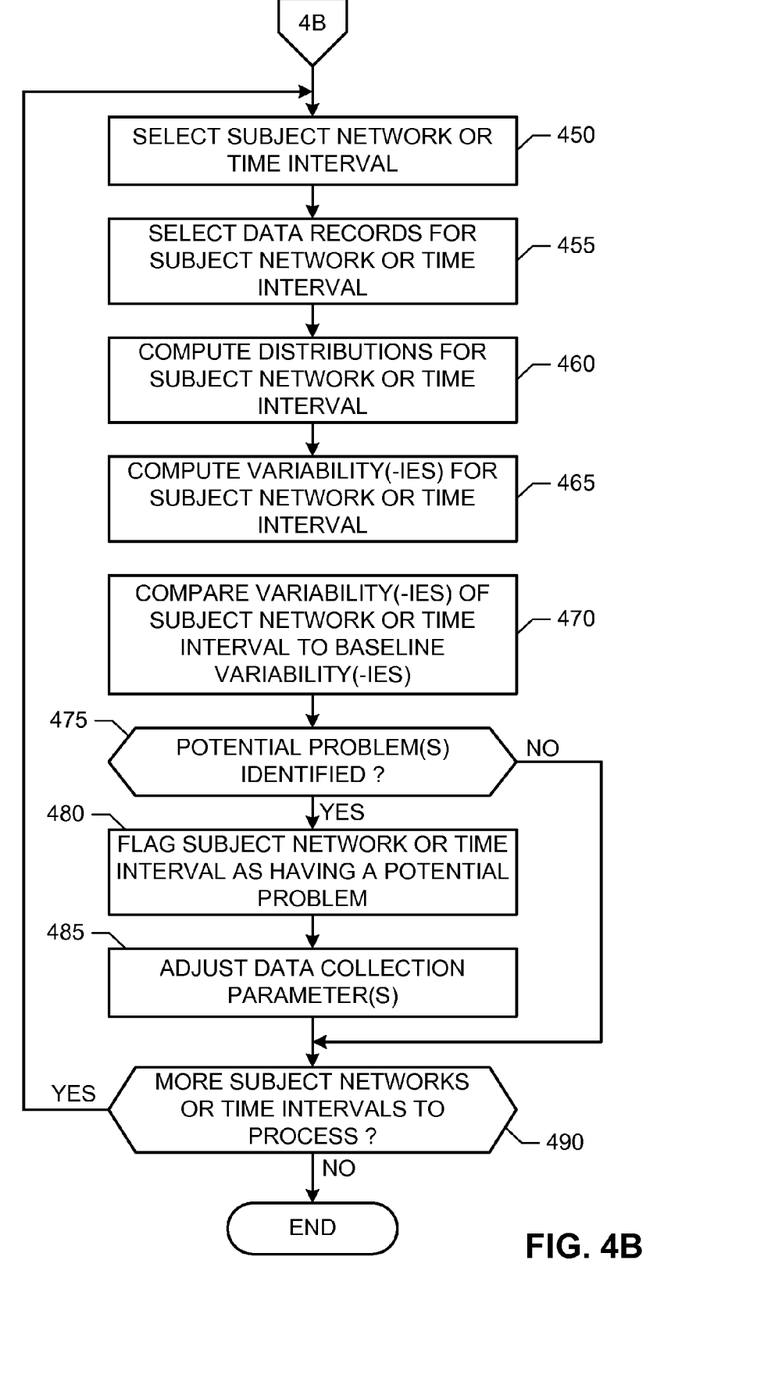

FIGS. 4A and 4B are a flowchart representative of an example process that may be carried out to implement the example customer-premises network analyzer 160 of FIGS. 1 and 2 and/or the example data analysis module 215 of FIGS. 2 and 3. The example process of FIGS. 4A and 4B may be carried out by a processor, a controller and/or any other suitable processing device. For example, the process of FIGS. 4A and 4B may be embodied in coded instructions stored on any article of manufacture, such as any tangible computer-readable medium. Example tangible computer-readable media include, but are not limited to, a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible instructions or data structures, and which can be electronically accessed by a processor, a general-purpose or special-purpose computer, or other machine with a processor (e.g., the example processor platform P100 discussed below in connection with FIG. 5). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example process of FIGS. 4A and 4B may be implemented using any combination(s) of ASIC(s), PLD(s), FPLD (s), discrete logic, hardware, firmware, etc. Also, some or all of the example processes of FIGS. 3 and 4 may instead be implemented manually or as any combination of any of the foregoing techniques, for example, any combination of firmware, software, discrete logic and/or hardware. Further, many other methods of implementing the example operations of FIGS. 4A and 4B may be employed. For example, the order of execution of the blocks may be changed, and/or one or more of the blocks described may be changed, eliminated, subdivided, or combined. Additionally, any or all of the example process of FIGS. 4A and 4B may be carried out sequentially and/or carried out in parallel by, for example, separate processing threads, processors, devices, discrete logic, circuits, etc.

The example process of FIGS. 4A and 4B begins when the example scheduler 220 of FIG. 2 directs the example data collector 140 to collect and/or retrieve performance information (block 405). The example record selector 305 selects customer-premises networks 134 and/or collection time intervals to be analyzed and obtains the corresponding performance information from the example performance database 150 (block 410). This selected performance information will subsequently be used as a baseline against which other performance information can be compared.

The example variability analyzer 310 computes one or more performance distributions for the selected performance information (block 415) and computes one or more variability metrics $V_n$ (block 420). The example network characterizer 315 compares the computed variability metrics $V_n$ to one or more thresholds to determine whether any potential problems are identifiable (block 425). If any potential problems are identified (block 425), the suspect customer-premises networks 134 are flagged (block 430) and the example collection parameter selector 320 adjusts their data collection parameters (block 435). Control then proceeds to block 450 of FIG. 4B. If no potential problems are identified (block 425), control proceeds to block 450 of FIG. 4B.

At block 450 of FIG. 4B, the record selector selects a subject customer-premises network 134 and/or collection time interval to be analyzed (block 450). The example record selector 305 obtains the performance information from the example performance database 150 for the selected subject customer-premises network 134 and/or time interval (block 455). The example variability analyzer 310 computes one or more performance distributions for the selected subject performance information (block 460) and computes one or more variability metrics $V_n$ (block 465).

The example network characterizer 315 compares the computed subject variability metrics $V_n$ to one or more thresholds and or the previously computed baseline variability metrics $V_n$ to determine whether any potential problems are identifiable (block 470). If no potential problems are identified (block 475), control proceeds to block 490 to determine if additional customer-premises networks 134 and/or time intervals are to be analyzed.

If any potential problems is identified (block 475), the current subject customer-premises network 134 is flagged (block 480) and the example collection parameter selector 320 adjusts its data collection parameters (block 485). If there are more customer-premises networks 134 and/or time intervals to be analyzed (block 490), control returns to block 450. If no more customer-premises networks 134 and/or time intervals remain to be analyzed (block 490), control exits from the example process of FIGS. 4A and 4B.

Figure 5:
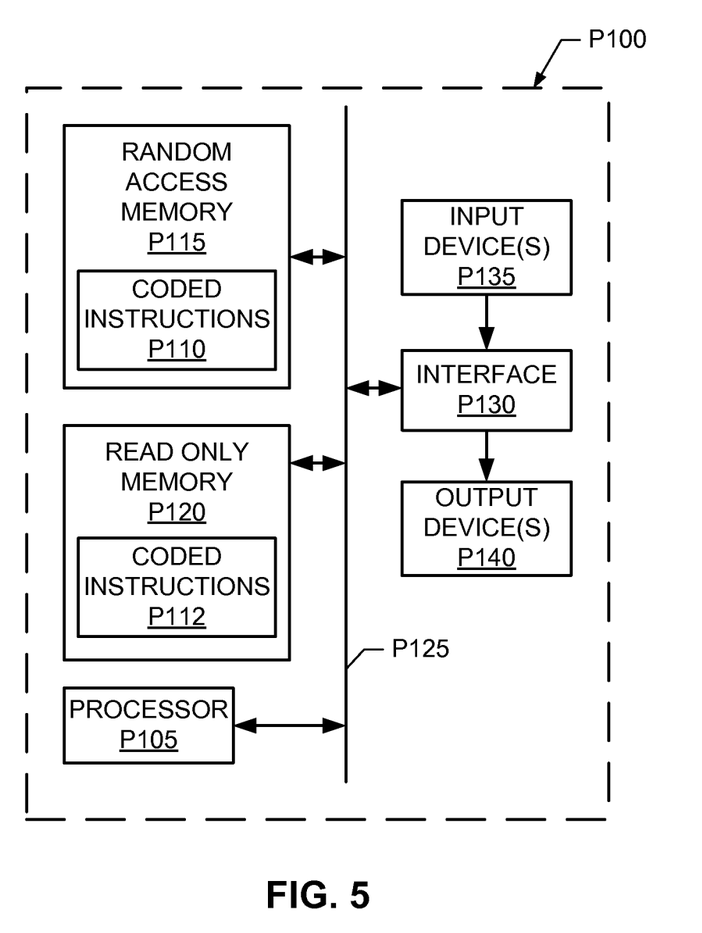
FIG. 5 is a schematic illustration of an example processor platform that may be used and/or programmed to execute the example process of FIGS. 4A and 4B and/or to implement any or all of the disclosed examples.

FIG. 5 is a schematic diagram of an example processor platform P100 that may be used and/or programmed to implement the example customer-premises network analyzer 160 of FIGS. 1 and 2 and/or the example data analysis module 215 of FIGS. 2 and 3. For example, the processor platform P100 can be implemented by one or more general-purpose processors, processor cores, microcontrollers, etc.

The processor platform P100 of the example of FIG. 5 includes at least one general purpose programmable processor P105. The processor P105 executes coded and/or machine-accessible instructions P110 and/or P112 stored in main memory of the processor P105 (e.g., within a RAM P115 and/or a ROM P120). The processor P105 may be any type of processing unit, such as a processor core, a processor and/or a microcontroller. The processor P105 may execute, among other things, the example process of FIGS. 4A and 4B to implement the example methods, apparatus and articles of manufacture described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P125. The interface circuit P125 may be implemented by any type of interface standard, such as an external memory interface, serial port, general-purpose input/output, etc. One or more input devices P130 and one or more output devices P140 are connected to the interface circuit P125. The input devices P130 and/or output devices P140 may be used to, for example, implement the example interface modules 205, 210 and 225 of FIG. 2.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   obtaining a first plurality of performance parameters for a first time interval for respective ones of a first plurality of customer-premises devices, wherein the first plurality of customer-premises devices form a first customer-premises communication network and each of the first plurality of customer-premises devices is communicatively coupled to a first residential gateway;
   obtaining a second plurality of performance parameters for a second time interval for the respective ones of the first plurality of customer-premises devices;
   computing a first performance distribution from the first and second plurality of performance parameters;
   computing a first ratio of a first value associated with a first percentile of the first performance distribution and a second value associated with a second percentile of the first performance distribution, the first ratio representative of a first performance variability of the first customer-premises communication network; and
   comparing the first performance variability to a second performance variability of a second customer-premises communication network communicatively coupled to a second residential gateway to determine whether the first customer-premises communication network is operating in accordance with a normal operating condition.

2. A method as defined in claim 1, further comprising:
   obtaining a third plurality of performance parameters for a third time interval for respective ones of the first plurality of customer-premises devices;
   obtaining a fourth plurality of performance parameters for a fourth time interval for respective ones of the first plurality of customer-premises devices;
   computing a second performance distribution from the third and fourth plurality of performance parameters;
   computing a second ratio of a third value associated with a third percentile of the second performance distribution and a fourth value associated with a fourth percentile of the second performance distribution, the second ratio representative of a third performance variability of the first customer-premises communication network; and
   comparing the first and second ratios to determine whether the first customer-premises communication network changed over time.

3. A method as defined in claim 1, further comprising selecting a collection configuration parameter for a third time interval based on the comparison of the first performance variability and the second performance variability.

4. A method as defined in claim 1, wherein the first plurality of performance parameters represents at least one of average noise values, maximum noise values, average error rates, maximum error rates, average data rates, or maximum data rates.

5. A method as defined in claim 1, further comprising configuring firewall port forwarding on the first residential gateway, wherein the first plurality of performance parameters is retrieved at a central office location via the configured firewall port forwarding.

6. A method as defined in claim 1, wherein the first plurality of performance parameters is obtained at a central office location via an application programming interface of at least one of the first residential gateway or the first plurality of customer-premises devices.

7. A tangible machine readable storage device comprising machine readable instructions which, when executed, cause a machine to perform operations comprising:
    obtaining a first plurality of performance parameters for a first time interval for respective ones of a first plurality of customer-premises devices, wherein the first plurality of customer-premises devices form a first customer-premises communication network and each of the first plurality of customer-premises devices is communicatively coupled to a first residential gateway;
    obtaining a second plurality of performance parameters for the first time interval for the respective ones of a second plurality of customer-premises devices, wherein the second plurality of customer-premises devices form a second customer-premises communication network and each of the second plurality of customer-premises devices are communicatively coupled to a second residential gateway;
    computing a first performance distribution from the first performance parameters;
    computing a first ratio based on a first percentile of the first performance distribution and a second percentile of the first performance distribution;
    computing a second performance distribution from the second performance parameters;
    computing a second ratio based on a third percentile of the second performance distribution and a fourth percentile of the second performance distribution; and
    comparing the first and second ratios to determine whether the first and second customer-premises communication networks are operating in accordance with a normal operating condition.

8. A tangible storage device as defined in claim 7, wherein the first plurality of performance parameters represents at least one of average noise values, maximum noise values, average error rates, maximum error rates, average data rates, or maximum data rates.

9. A tangible storage device as defined in claim 7, wherein the operations further comprise:
    enabling firewall port forwarding on the first residential gateway; and
    obtaining the first plurality of performance parameters via the firewall port forwarding.

10. A tangible storage device as defined in claim 7, wherein the operations further comprise accessing an application programming interface of the first residential gateway to obtain the first plurality of performance parameters.

11. A tangible storage device as defined in claim 7, wherein the first time interval occurs prior to an event corresponding at least one of a storm, a software update a configuration change, an installation of another customer-premises device, a temperature change, a replacement of one of the first plurality of customer-premises devices, a technician repair, or a cabling change.

12. An apparatus comprising:
    memory comprising machine readable instructions; and
    a processor to execute the machine readable instructions to perform operations comprising:
        collecting a first plurality of performance parameters for a first time interval for respective ones of a first plurality of customer-premises devices, wherein the first plurality of customer-premises devices form a first customer-premises communication network and each of the first plurality of customer-premises devices is communicatively coupled to a first residential gateway;
        collecting a second plurality of performance parameters for a second time interval for the respective ones of the first plurality of customer-premises devices;
        computing a first performance distribution from the first and second plurality of performance parameters;
        computing a first ratio of a first value associated with a first percentile of the first performance distribution and a second value associated with a second percentile of the first performance distribution, the first ratio representative of a first performance variability of the first customer-premises communication network; and
        comparing the first performance variability to a a second performance variability of a second customer-premises communication network communicatively coupled to a second residential gateway to determine whether the first customer-premises communication network is operating in accordance with a normal operating condition.

13. An apparatus as defined in claim 12, wherein the operations further comprise selecting a collection configuration parameter for a third time interval based on the comparison of the first performance variability and the second performance variability.

14. An apparatus as defined in claim 12, wherein the first plurality of performance parameters represents at least one of average noise values, maximum noise values, average error rates, maximum error rates, average data rates, or maximum data rates.

* * * * *